(12) United States Patent
Wang et al.

(10) Patent No.: US 12,519,365 B2
(45) Date of Patent: Jan. 6, 2026

(54) MOTOR

(71) Applicant: NIDEC CORPORATION, Kyoto (JP)

(72) Inventors: Yu Wang, Liaoning (CN); Suyan Ge, Liaoning (CN); Hiroshi Sambuichi, Kyoto (JP); Xueling Zhou, Liaoning (CN)

(73) Assignee: NIDEC CORPORATION, Kyoto (JP)

( * ) Notice: Subject to any disclaimer, the term of this patent is extended or adjusted under 35 U.S.C. 154(b) by 360 days.

(21) Appl. No.: 18/469,564

(22) Filed: Sep. 19, 2023

(65) Prior Publication Data

US 2024/0113591 A1 Apr. 4, 2024

(30) Foreign Application Priority Data

Sep. 30, 2022 (CN) .......................... 202211206866.9

(51) Int. Cl.
*H02K 5/00* (2006.01)
*H02K 5/22* (2006.01)

(52) U.S. Cl.
CPC ......... *H02K 5/225* (2013.01); *H02K 2203/09* (2013.01)

(58) Field of Classification Search
CPC .......... H02K 5/225; H02K 3/50; H02K 3/505; H02K 3/52; H02K 3/521; H02K 3/522; H02K 3/524; H02K 3/525; H02K 3/46; H02K 3/28; H02K 3/18; H02K 1/146; H02K 1/2706; H02K 2203/09
USPC .......................................................... 310/71
See application file for complete search history.

(56) References Cited

U.S. PATENT DOCUMENTS

| | | | | |
|---|---|---|---|---|
| 2,871,285 A | * | 1/1959 | Fouse ...................... | H02G 5/06 174/88 B |
| 2,977,449 A | * | 3/1961 | Roethlisberger ......... | H02G 5/08 361/675 |
| 4,420,701 A | * | 12/1983 | Nikitin ..................... | H02K 3/47 310/71 |
| 4,590,397 A | * | 5/1986 | Davis ...................... | H02K 5/225 310/43 |
| 4,689,546 A | * | 8/1987 | Stephens ................ | H02K 5/225 310/71 |

(Continued)

FOREIGN PATENT DOCUMENTS

WO WO-2018051988 A1 * 3/2018 ............... H02K 5/10

OTHER PUBLICATIONS

WO 2018051988A1 English Translation.*

*Primary Examiner* — Maged M Almawri
(74) *Attorney, Agent, or Firm* — JCIPRNET (57) ABSTRACT

Disclosed is a motor, which includes: a housing; a support plate fixed on the housing; an upper busbar holder holding the upper busbar and defined on the support plate; a lower busbar holder holding the lower busbar; one end of the upper busbar is connected to the lower busbar, and the other end of the upper busbar is connected to an external power supply; one end of the lower busbar is connected to the coil lead wire, and the other end of the lower busbar is connected to the upper busbar, the upper busbar holder has a first through-hole penetrating in the axial direction, the support plate has a second through-hole penetrating in the axial direction; the other end of the lower busbar passes through the first through-hole and the second through-hole, and is connected to one end of the upper busbar.

10 Claims, 9 Drawing Sheets

(56) References Cited

U.S. PATENT DOCUMENTS

| | | | | |
|---|---|---|---|---|
| 4,799,309 A * | 1/1989 | Cinzori | ............. | H02K 11/05 257/E25.026 |
| 4,896,062 A * | 1/1990 | Pollard | ............. | H01L 25/117 363/145 |
| 5,517,063 A * | 5/1996 | Schantz, Jr. | ............. | B60L 3/00 363/71 |
| 5,559,385 A * | 9/1996 | Yalovega | ............. | H02K 3/28 310/198 |
| 5,573,414 A * | 11/1996 | Taillon | ............. | H02K 3/505 29/889.22 |
| 5,682,070 A * | 10/1997 | Adachi | ............. | H02K 19/22 310/71 |
| 5,728,975 A * | 3/1998 | Tanaka | ............. | H01R 12/62 439/115 |
| 6,014,007 A * | 1/2000 | Seibel | ............. | H02P 21/34 318/807 |
| 6,069,428 A * | 5/2000 | Nelson | ............. | H02K 11/33 310/90 |
| 6,111,328 A * | 8/2000 | Ota | ............. | H02P 25/08 307/147 |
| 6,252,327 B1 * | 6/2001 | Matsuzaki | ............. | H02K 3/12 310/201 |
| 6,271,608 B1 * | 8/2001 | Haydock | ............. | H02K 5/225 310/260 |
| 6,464,538 B2 * | 10/2002 | Miyazaki | ............. | H01R 13/6589 439/95 |
| 6,469,413 B1 * | 10/2002 | Oohashi | ............. | H02K 11/05 310/201 |
| 6,475,007 B2 * | 11/2002 | Sugata | ............. | H01R 35/025 439/164 |
| 6,514,100 B2 * | 2/2003 | Maegawa | ............. | H01R 12/61 439/492 |
| 6,538,356 B1 * | 3/2003 | Jones | ............. | H02K 3/50 310/422 |
| 6,737,773 B2 * | 5/2004 | Hayashi | ............. | F04B 27/0895 310/71 |
| 6,856,057 B2 * | 2/2005 | Kobayashi | ............. | H02K 15/30 310/71 |
| 6,917,174 B2 * | 7/2005 | Carruthers | ............. | G01R 15/18 318/474 |
| 6,930,418 B2 * | 8/2005 | Kobayashi | ............. | H02K 3/522 310/239 |
| 7,445,529 B2 * | 11/2008 | Takizawa | ............. | H01R 13/113 439/845 |
| 7,936,099 B2 * | 5/2011 | Staudemann | ............. | H02K 11/33 310/198 |
| 7,948,130 B2 * | 5/2011 | Kitagawa | ............. | H02K 3/522 310/71 |
| 8,339,001 B2 * | 12/2012 | Ghodsi-Khameneh | ............. | H02K 3/28 310/71 |
| 8,816,550 B2 * | 8/2014 | Kim | ............. | B62D 5/0403 310/43 |
| 8,853,910 B2 * | 10/2014 | Sato | ............. | H02K 3/24 310/194 |
| 8,922,080 B2 * | 12/2014 | Nakagawa | ............. | H01R 43/16 310/71 |
| 9,866,080 B2 * | 1/2018 | Kim | ............. | F04C 23/001 |
| 10,186,928 B2 * | 1/2019 | Firat | ............. | H02K 11/25 |
| 10,476,334 B2 * | 11/2019 | Owen | ............. | H01G 4/248 |
| 10,749,404 B2 * | 8/2020 | Degner | ............. | H02K 3/525 |
| 10,790,626 B2 * | 9/2020 | Lee | ............. | H01R 25/162 |
| 11,025,141 B2 * | 6/2021 | Kagawa | ............. | H02M 1/126 |
| 11,411,453 B2 * | 8/2022 | Iwano | ............. | H02K 5/00 |
| 12,057,754 B2 * | 8/2024 | Zhang | ............. | H02K 11/22 |
| 2002/0084713 A1 * | 7/2002 | Kuroyanagi | ............. | H02K 3/50 310/71 |
| 2003/0173842 A1 * | 9/2003 | Kobayashi | ............. | H02K 15/10 310/71 |
| 2003/0178896 A1 * | 9/2003 | Crane | ............. | H02K 3/28 310/71 |
| 2003/0201688 A1 * | 10/2003 | Yamamura | ............. | H02K 3/522 310/71 |
| 2003/0214196 A1 * | 11/2003 | Cai | ............. | H02K 3/14 310/208 |
| 2004/0135457 A1 * | 7/2004 | Holzheu | ............. | H02K 3/12 310/201 |
| 2005/0023910 A1 * | 2/2005 | Lukenich | ............. | H02K 3/522 310/179 |
| 2005/0189828 A1 * | 9/2005 | Nakayama | ............. | B62D 5/0403 310/71 |
| 2005/0189833 A1 * | 9/2005 | Liao | ............. | H02K 3/505 310/201 |
| 2005/0236921 A1 * | 10/2005 | Yoneda | ............. | H02K 3/522 310/179 |
| 2005/0236922 A1 * | 10/2005 | Yoneda | ............. | H02K 3/522 310/179 |
| 2005/0248228 A1 * | 11/2005 | Yoneda | ............. | H02K 3/522 310/179 |
| 2005/0253466 A1 * | 11/2005 | Seguchi | ............. | H02K 3/28 310/179 |
| 2006/0043806 A1 * | 3/2006 | Torii | ............. | H02K 3/522 310/194 |
| 2006/0138883 A1 * | 6/2006 | Yagai | ............. | H02K 3/522 310/179 |
| 2006/0202584 A1 * | 9/2006 | Jore | ............. | H02K 11/215 310/179 |
| 2008/0018193 A1 * | 1/2008 | Kobayashi | ............. | H02K 5/225 310/219 |
| 2009/0039720 A1 * | 2/2009 | Tsukashima | ............. | H02K 5/225 310/71 |
| 2009/0072653 A1 * | 3/2009 | Harada | ............. | H02K 3/18 29/596 |
| 2009/0102309 A1 * | 4/2009 | Kamibayashi | ............. | H02K 3/12 310/195 |
| 2009/0102312 A1 * | 4/2009 | Tsukashima | ............. | H02K 3/522 310/215 |
| 2009/0127948 A1 * | 5/2009 | Shimizu | ............. | H02K 3/50 903/906 |
| 2009/0152975 A1 * | 6/2009 | Sasaki | ............. | H02K 3/522 310/195 |
| 2010/0045133 A1 * | 2/2010 | Ciampolini | ............. | H02K 3/50 310/201 |
| 2010/0201213 A1 * | 8/2010 | Kataoka | ............. | H02K 11/21 310/71 |
| 2011/0018376 A1 * | 1/2011 | Kataoka | ............. | H02K 3/522 310/71 |
| 2011/0068647 A1 * | 3/2011 | Sakaue | ............. | H02K 3/28 310/71 |
| 2011/0109178 A1 * | 5/2011 | Okamoto | ............. | H02K 3/12 310/71 |
| 2011/0156512 A1 * | 6/2011 | Shimomura | ............. | H02K 3/522 310/71 |
| 2011/0215662 A1 * | 9/2011 | Lee | ............. | H02K 3/38 310/71 |
| 2011/0278974 A1 * | 11/2011 | Matsuyama | ............. | H02K 3/52 310/71 |
| 2011/0297474 A1 * | 12/2011 | Aono | ............. | B62D 5/0403 174/68.2 |
| 2012/0037436 A1 * | 2/2012 | Kwon | ............. | H02K 3/50 310/71 |
| 2012/0086292 A1 * | 4/2012 | Ishida | ............. | H02K 11/25 310/71 |
| 2012/0126646 A1 * | 5/2012 | Nakagawa | ............. | H02K 5/225 310/71 |
| 2012/0146437 A1 * | 6/2012 | Kernahan | ............. | H02P 11/06 310/71 |
| 2012/0262014 A1 * | 10/2012 | Katou | ............. | H02K 3/522 310/71 |
| 2012/0286593 A1 * | 11/2012 | Yokogawa | ............. | H02K 3/522 310/43 |
| 2012/0319512 A1 * | 12/2012 | Nakagawa | ............. | H02K 1/278 310/71 |
| 2013/0069461 A1 * | 3/2013 | Arai | ............. | H02K 3/522 310/71 |
| 2013/0113313 A1 * | 5/2013 | Ikura | ............. | H02K 3/522 310/71 |

(56) References Cited

U.S. PATENT DOCUMENTS

| | | | |
|---|---|---|---|
| 2013/0328426 A1* | 12/2013 | Jang | H02K 3/522 310/71 |
| 2014/0014390 A1* | 1/2014 | Chamberlin | H02K 15/32 174/68.2 |
| 2014/0015359 A1* | 1/2014 | Chamberlin | H02K 3/522 310/71 |
| 2014/0113472 A1* | 4/2014 | Chamberlin | H02K 3/50 439/212 |
| 2014/0125173 A1* | 5/2014 | Hayashi | H02K 5/10 310/88 |
| 2014/0175921 A1* | 6/2014 | Tomita | H02K 3/50 310/71 |
| 2014/0232215 A1* | 8/2014 | Takasaki | H02K 11/0094 310/43 |
| 2014/0232223 A1* | 8/2014 | Takasaki | H02K 3/28 310/71 |
| 2015/0015095 A1* | 1/2015 | Kurono | H02K 3/50 310/54 |
| 2015/0076944 A1* | 3/2015 | Shim | H02K 3/28 310/71 |
| 2015/0097453 A1* | 4/2015 | Nishikawa | H02K 3/50 310/71 |
| 2015/0188377 A1* | 7/2015 | Kim | H02K 1/278 417/415 |
| 2015/0229172 A1* | 8/2015 | Kashihara | H02K 5/225 310/71 |
| 2015/0263580 A1* | 9/2015 | Houzumi | B29C 45/14065 310/43 |
| 2015/0311764 A1* | 10/2015 | Nakamura | H02K 3/522 310/71 |
| 2016/0013691 A1 | 1/2016 | Houzumi et al. | |
| 2016/0111931 A1* | 4/2016 | Kakuda | H02K 5/08 310/43 |
| 2016/0254717 A1* | 9/2016 | Hoshina | H02K 3/18 310/71 |
| 2016/0301272 A1* | 10/2016 | Haruno | H02K 1/12 |
| 2017/0093239 A1* | 3/2017 | Teranishi | H02K 3/28 |
| 2017/0104281 A1* | 4/2017 | Kurono | H02K 3/522 |
| 2017/0126092 A1* | 5/2017 | Han | H02K 5/225 |
| 2017/0250585 A1* | 8/2017 | Ohashi | H02K 15/33 |
| 2017/0366060 A1* | 12/2017 | Haberkorn | H02K 3/522 |
| 2018/0006522 A1* | 1/2018 | Hiramitsu | H02K 3/522 |
| 2018/0175570 A1* | 6/2018 | Houzumi | H02K 3/50 |
| 2018/0241268 A1* | 8/2018 | Asahi | H02K 3/28 |
| 2018/0309340 A1* | 10/2018 | Ogawa | H02K 3/28 |
| 2018/0316238 A1* | 11/2018 | Kong | H02K 3/522 |
| 2019/0356190 A1* | 11/2019 | Kitta | H02K 1/148 |
| 2020/0014272 A1* | 1/2020 | Asahi | H02K 3/50 |
| 2020/0059127 A1* | 2/2020 | Yamashita | H02K 3/522 |
| 2021/0194310 A1* | 6/2021 | Yoshikawa | H02K 5/225 |
| 2021/0305853 A1* | 9/2021 | Takahashi | H02K 3/522 |
| 2021/0305870 A1* | 9/2021 | Takahashi | H02K 5/08 |
| 2022/0271597 A1* | 8/2022 | Kamizato | H02K 3/50 |
| 2023/0101842 A1* | 3/2023 | Okamoto | H02K 5/1672 310/66 |
| 2024/0305146 A1* | 9/2024 | Zuo | H02K 1/148 |
| 2024/0429767 A1* | 12/2024 | Ha | H02K 3/522 |

* cited by examiner

MOTOR

CROSS REFERENCE TO RELATED APPLICATIONS

The present disclosure claims priority under 35 U.S.C. § 119 to Chinese Application No. 202211206866.9 filed on Sep. 30, 2022 the entire content of which is incorporated herein by reference.

FIELD OF THE DISCLOSURE

The present disclosure relates to the field of electromechanical technology, in particular to a motor.

BACKGROUND

As science and technology continue to develop, motors have been adopted in various electrical products. Existing brushless motors are generally equipped with a busbar assembly configured to supply power to a coil. The busbar assembly includes a busbar and a busbar holder for holding the busbar. The conventional busbar assembly is a single product. The busbar assembly and the stator are assembled, the position degree of the terminal, that is, the position in the axial direction and the circumferential direction, is managed by the fitting of the insulator with the resin leg of the busbar holder.

It should be noted that the above description of the technical background is only for the convenience of clearly and completely describing the technical solutions of the present disclosure, and for facilitating the understanding of those skilled in the art. It should not be assumed that the above-mentioned technical solutions are commonly known to those skilled in the art simply because these solutions are described in the background section of the present disclosure.

The inventor found that: in existing solutions, since the stator and the busbar assembly respectively have their own tolerances, and when the stator and the busbar assembly are assembled inside the housing, the stator and the busbar assembly respectively further generate cumulative tolerances in the axial direction and the circumferential direction. As a result, the positional degree of the terminals is not good, and the positioning accuracy of the terminals in the circumferential direction and the axial direction is insufficient.

SUMMARY

According to an aspect of the exemplary embodiments of the present disclosure, a motor includes: a housing; a support plate, which is fixed on the housing; an upper busbar holder holding the upper busbar and defined on the support plate; a lower busbar holder, which holds the lower busbar; one end of the upper busbar is connected to the lower busbar, and the other end of the upper busbar is connected to an external power supply; one end of the lower busbar is connected to the coil lead wire, and the other end of the lower busbar is connected to the upper busbar, the upper busbar holder has a first through-hole penetrating in the axial direction, the support plate has a second through-hole penetrating in the axial direction, and the first through-hole and the second through-hole are at least partially overlapped in the axial direction; the other end of the lower busbar passes through the first through-hole and the second through-hole, and is connected to one end of the upper busbar.

In this way, the positioning accuracy of the terminal in the circumferential direction and axial direction is improved.

In some exemplary embodiments, the inner circumferential surface of the housing is configured with a stepped component; the support plate is mounted on the stepped component, and the upper busbar holder is mounted on the upper surface of the support plate.

In this manner, compared with the dimensional tolerance of the stator itself, as well as the cumulative tolerance generated when arranging the stator on the housing, the above structure has smaller tolerance and more accurate dimension in axial direction.

In some exemplary embodiments, the upper busbar holder is mounted on the upper surface of the support plate through interference fitting. Rib components are defined on the inner circumference of the upper busbar holder and a position radially opposite to the first through-hole, and the rib components abut against the support plate.

In this manner, when the upper busbar holder is pressed into the support plate, the rib component may expand radially outwards to adjust the concentricity of the upper busbar holder and the support plate, and it is possible to prevent the rib component from being damaged during configuration.

In some exemplary embodiments, one end of the upper busbar is configured with a first guiding surface inclined in the axial direction, and the other end of the lower busbar is configured with a second guiding surface inclined in the axial direction and facing the first guiding surface.

In this way, it is possible to prevent the upper and lower busbars from interfering each other during assembly, thereby facilitating connection.

In some exemplary embodiments, one end of the upper busbar is a bent structure, and a surface of the bent structure facing the lower busbar defines the first guiding surface.

In this way, the range of the first guiding surface is larger and the first guiding surface may be deformed to further prevent the interference between the upper and lower busbars during assembly, and making connection easier.

In some exemplary embodiments, the number of the upper busbars is the same as the number of the second through-holes, and both of them are respectively provided in plurality. Each of the upper busbars is L-shaped or substantially L-shaped, and at least a portion of one L-shaped-arm of different upper busbars is axially opposed to different second through-holes. The other L-shaped-arm is axially displaced from the second through-hole, and the other L-shaped-arm is connected to the external power supply.

In this way, each upper busbar corresponds to a through-hole, thereby improving the positional accuracy of the terminals and facilitate electrical connection.

In some exemplary embodiments, a portion of the upper busbar that is opposite to the second through-hole extends axially to the first through-hole.

In this manner, a more reliable connection is established.

In some exemplary embodiments, a portion of the upper busbar holder extends into the second through-hole along the edge of the second through-hole.

In this way, the effect of insulation may be achieved.

In some exemplary embodiments, the upper busbar holder is integrally defined on the lower surface of the support plate, and the outer circumference of the support plate is interference fitted with the housing.

In this manner, the available space outside the motor is not occupied, and the availability of the space outside the motor is increased.

In some exemplary embodiments, a portion of the upper busbar holder passes through the second through-hole along the edge of the second through-hole, and is hooked on the upper surface of the support plate.

In this way, the effect of insulation may be achieved, and it is possible to prevent the upper resin holder from falling off from the support plate.

The above and other elements, features, steps, characteristics and advantages of the present disclosure will become more apparent from the following detailed description of the preferred embodiments with reference to the attached drawings.

Features described and/or illustrated for one embodiment may be used in the same or similar manner in one or more other embodiments, combined with features in other embodiments, or replace features in other embodiments.

BRIEF DESCRIPTION OF THE DRAWINGS

In the following detailed description in conjunction with the accompanying drawings, the above and other objects, features and advantages of the exemplary embodiments of the present disclosure will become more clear, and in the accompanying drawings.

DESCRIPTION OF THE EMBODIMENTS

The foregoing and other features of the present disclosure will become clear from the following description with reference to the accompanying drawings. In the specification and drawings, exemplary embodiments of the disclosure are disclosed in detail, showing some embodiments in which the principles of the disclosure may be employed. It may be understood that the disclosure is not limited to the described embodiments, but rather the disclosure includes all modifications, variations and equivalents falling within the scope of the appended claims.

In exemplary embodiments of the present disclosure, the term "and/or" includes any one and all combinations of one or more of the associated listed terms. The terms "comprising", "including", "having" and the like refer to the presence of described features, elements, portions or components, but do not exclude the presence or addition of one or more other features, elements, portions or components.

In exemplary embodiments of the present disclosure, the singular forms "a", "the", etc. include plural forms, and should be broadly understood as "one kind of" or "one type of" rather than being limited to the meaning of "one". In addition, the term "the" is understood to include both the singular and the plural meanings, unless the context clearly dictates otherwise. Furthermore, the term "according to" should be understood as "at least in part according to . . . " and the term "based on" should be understood as "based at least in part on . . . " unless the context clearly dictates otherwise.

Furthermore, in the following description of the present disclosure, for ease of description, a direction that extends along the central axis CC' of the motor or parallel to its direction is referred to as "axial direction", a radial direction using the central axis as the center is referred to as "radial direction", and a direction surrounding the central axis is referred to as "circumferential direction". A side away from the central axis in the radial direction is referred to as "radially outer side", and a side closer to the central axis in the radial direction is referred to as "radially inner side". Additionally, a direction pointing from the bottom of the motor housing toward the opening of the motor housing is referred to as "above" or "upper side", and a direction pointing from the opening of the motor housing toward the bottom of the motor housing is referred to as "below" or "lower side". It should be noted that the definitions of each direction in this specification are only for ease of describing exemplary embodiments of the present disclosure, and do not limit the direction of the motor and the like during use and manufacture.

The implementation of exemplary embodiments of the present disclosure will be described below with reference to the accompanying drawings.

Figure 1:
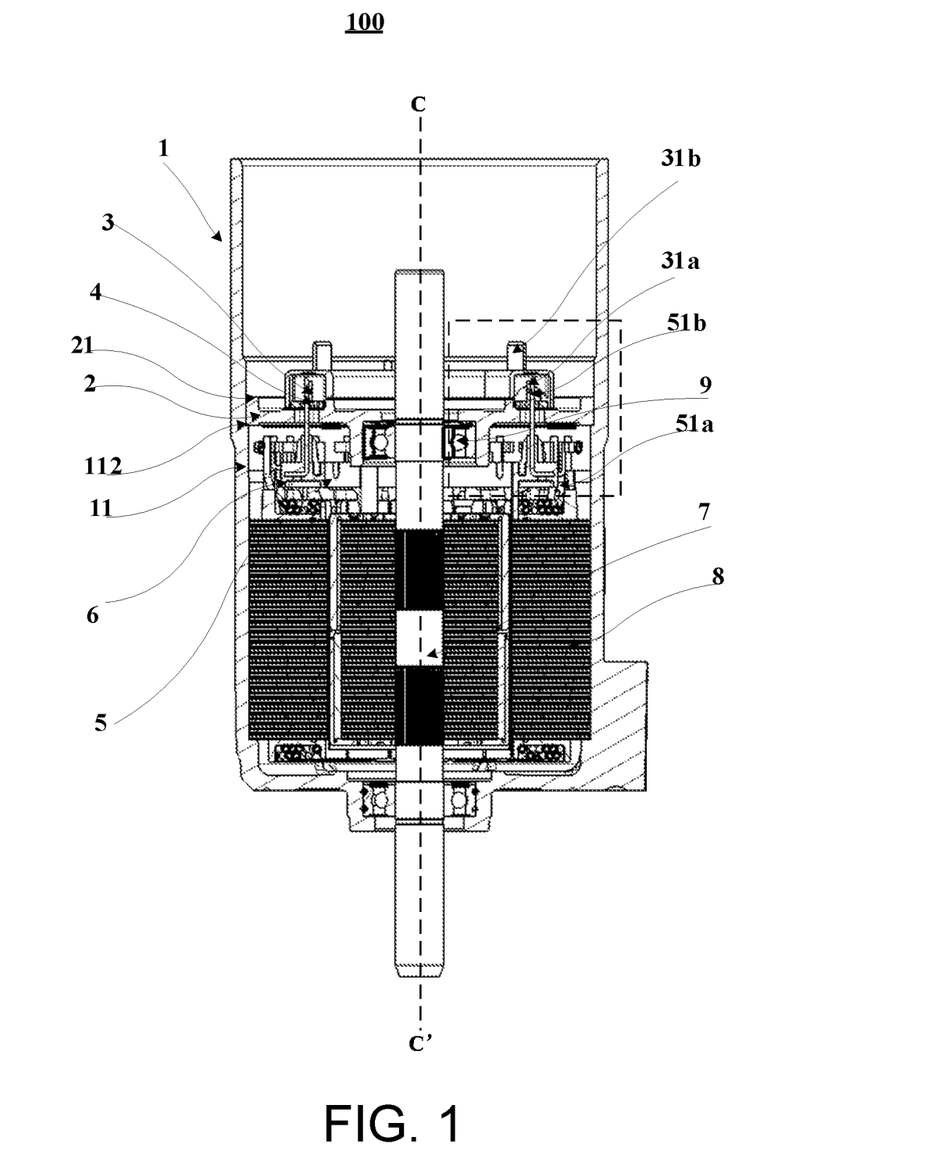
FIG. 1 is a sectional view of an example of a motor in an exemplary embodiment of the present disclosure.
Figure 2:
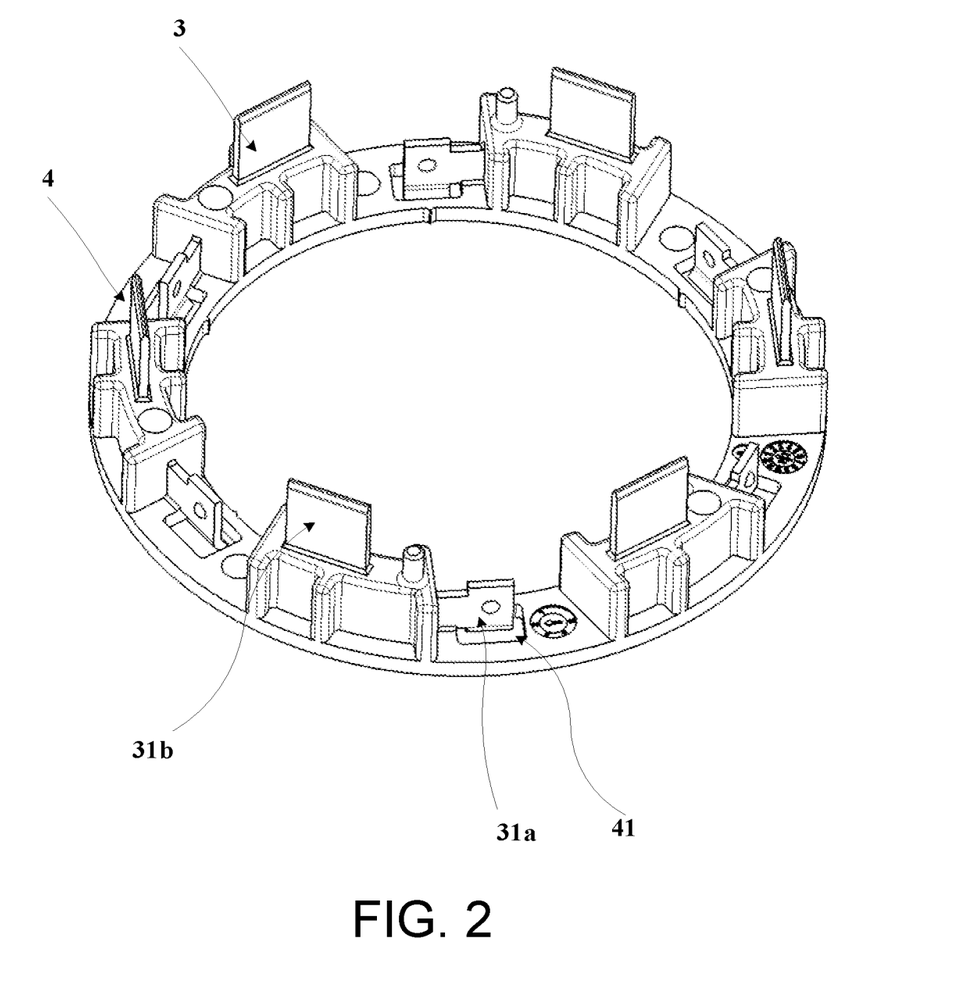
FIG. 2 is a schematic view of an upper busbar assembly of the motor shown in FIG. 1.
Figure 3:
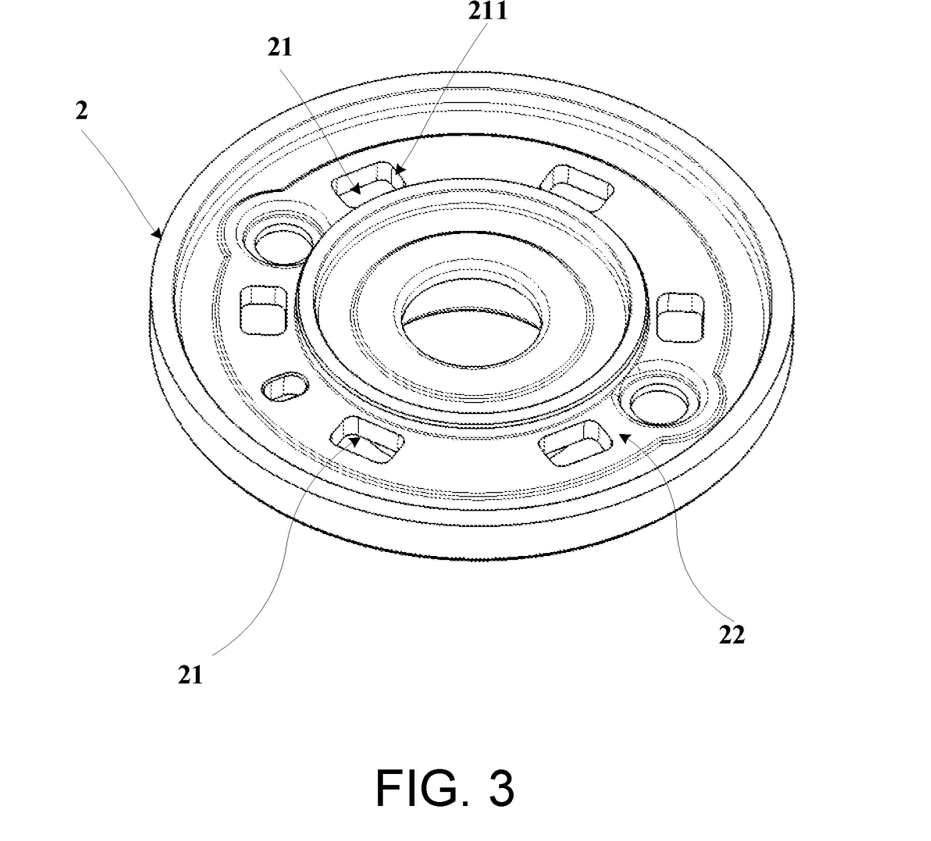
FIG. 3 is a schematic view of the support plate of the motor shown in FIG. 1.
Figure 4:
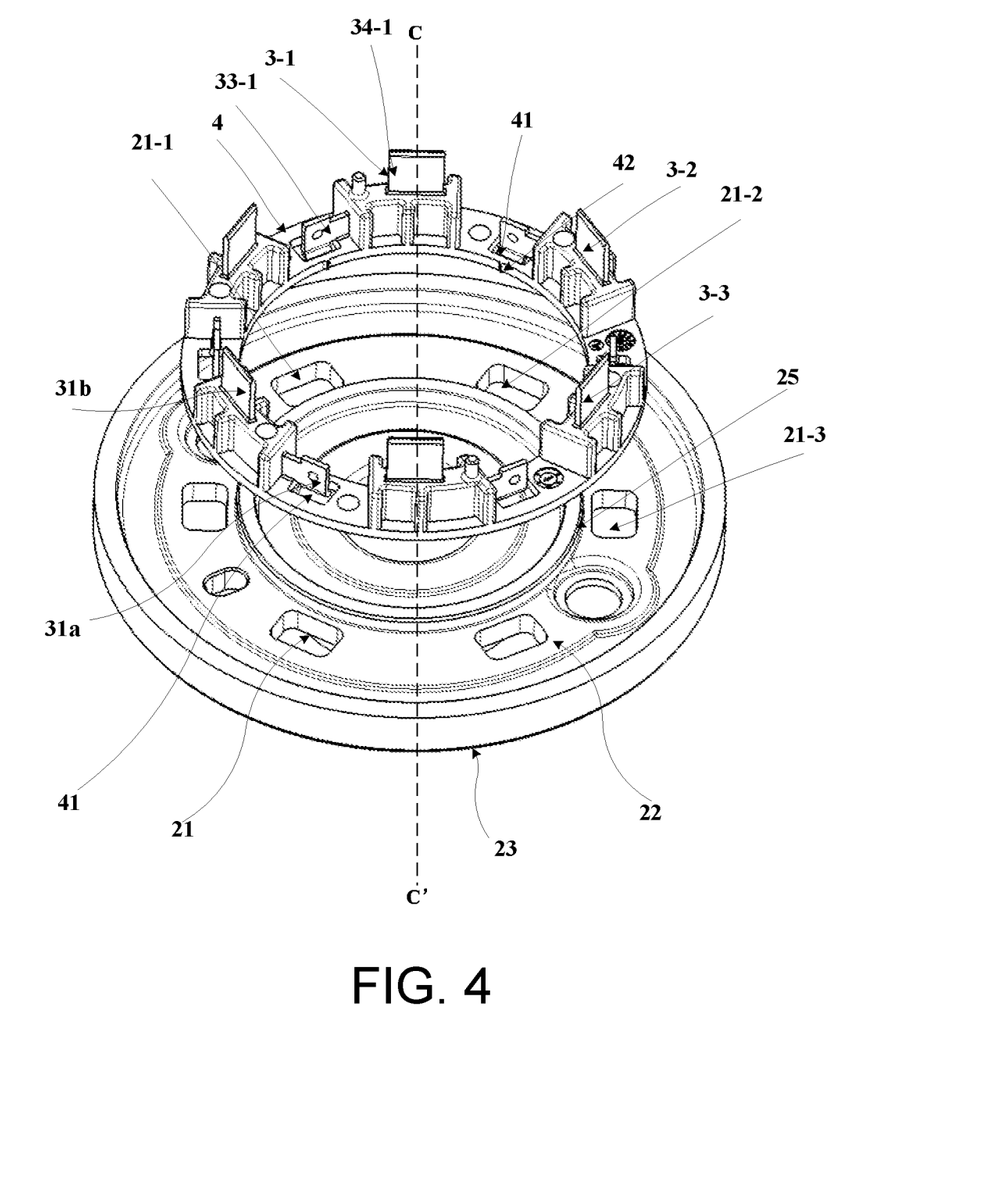
FIG. 4 is an exploded schematic view of the upper busbar assembly and the support plate of the motor shown in FIG. 1.

FIG. 1 is a sectional view of an example of a motor in an exemplary embodiment of the present disclosure. FIG. 2 is a schematic view of an upper busbar assembly of the motor shown in FIG. 1. FIG. 3 is a schematic view of the support plate of the motor shown in FIG. 1. FIG. 4 is an exploded schematic view of the upper busbar assembly and the support plate of the motor shown in FIG. 1.

As shown in FIG. 1, the motor 100 includes a housing 1, a support plate 2, an upper busbar 3, an upper busbar holder 4, a lower busbar 5, and a lower busbar holder 6. The support plate 2 is fixed on the housing 1, the upper busbar holder 4 holds the upper busbar 3 and is disposed on the support plate 2, and the lower busbar holder 6 holds the lower busbar 5. The upper busbar holder 4 and the upper busbar 3 define the upper busbar assembly, and the lower busbar holder 6 and the lower busbar 5 define the lower busbar assembly.

The above only illustrates the structure of the motor related to the present disclosure. Those skilled in the art should understand that the motor may also have other structures, such as the rotating shaft 7, stator 8, bearing 9 and so on shown in FIG. 1. For the details of other composition, reference may be made to related technologies, and related descriptions are omitted here.

In an exemplary embodiment of this disclosure, as shown in FIG. 1, one end 31a of the upper busbar 3 is connected to the lower busbar 5, the other end 31b of the upper busbar 3 is connected to an external power supply (not shown in the figure), one end 51a of the lower busbar is connected to the coil lead wire, and the other end 51b of the lower busbar 5 is connected to the upper busbar 3.

As shown in FIG. 1 to FIG. 4, the upper busbar holder 4 has a first through-hole 41 (as shown in FIG. 2) penetrating in the axial direction (such as CC' shown in FIG. 1), and the support plate 2 has a second through-hole 21 (as shown in FIG. 3) penetrating in the axial direction. The first through-hole 41 and the second through-hole 21 at least partially overlap each other in the axial direction, and the other end 51b of the lower busbar 5 passes through the first through-hole 41 and the second through-hole 21, and is connected to one end 31a of the upper busbar 3.

In this way, by dividing the busbar assembly into upper layer and lower layer, and by disposing the upper busbar 3 and the upper busbar holder 4 on the support plate 2, it is possible to avoid the cumulative tolerances generated by the busbar assembly and stator 8 themselves and the cumulative tolerances generated when the busbar assembly and stator 8 are assembled into the housing, thereby improving the positional degree of the terminal in the axial direction. By setting the axially penetrating first through-hole 41 and the second through-hole 21 on the upper busbar holder 4 and the support plate 2 respectively, it is possible to make the lower busbar 5 pass through the first through-hole 41 and the second through-hole 21 and to connect to the upper busbar 3, thereby improving the positional degree of the terminal in the circumferential direction, and thus enhancing the positioning accuracy of the terminal in the circumferential direction and the axial direction.

In the above exemplary embodiments, the support plate 2 is fixed on the housing 1, but the disclosure is not limited thereto, and the support plate 2 may also be a plate-shaped or substantially plate-shaped structure disposed inside the motor 100.

Figure 5:
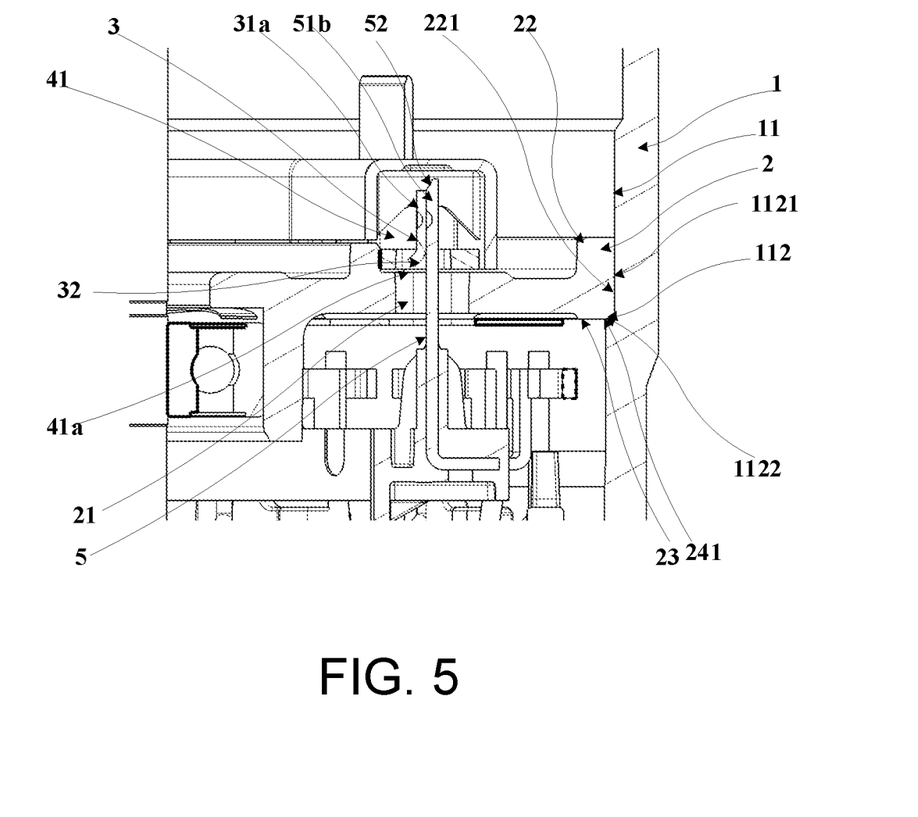
FIG. 5 is an enlarged view of the schematic part shown in the dashed-line box in FIG. 1.

FIG. 5 is an enlarged view of the schematic part shown in the dashed-line box in FIG. 1.

In some exemplary embodiments, as shown in FIG. 5, the inner circumferential surface 11 of the housing 1 is configured with a stepped component 112; the support plate 2 is mounted on the stepped component 112, and the upper busbar holder 4 is mounted on the upper surface 22 of the support plate 2.

For example, as shown in FIG. 1 and FIG. 5, the diameters of the inner circumferential surface 11 of the housing 1 are different, thereby defining a stepped component 112. The support plate 2 is mounted on the stepped component 112, and the radially outer end surface 221 of the support plate 2 abuts against the first surface 1121 of the stepped component 112 of the housing 1. A surface 241 of the lower surface 23 of the support plate 2 near the outer end surface 221 abuts against the second surface 1122 of the stepped component 112 of the housing 1. The upper busbar holder 4 is mounted on the upper surface 22 of the support plate 2.

In this manner, compared with the dimensional tolerance of the stator 8 itself, as well as the cumulative tolerance generated when arranging the stator 8 on the housing 1, the above structure has smaller tolerance and more accurate dimension in axial direction.

Figure 6:
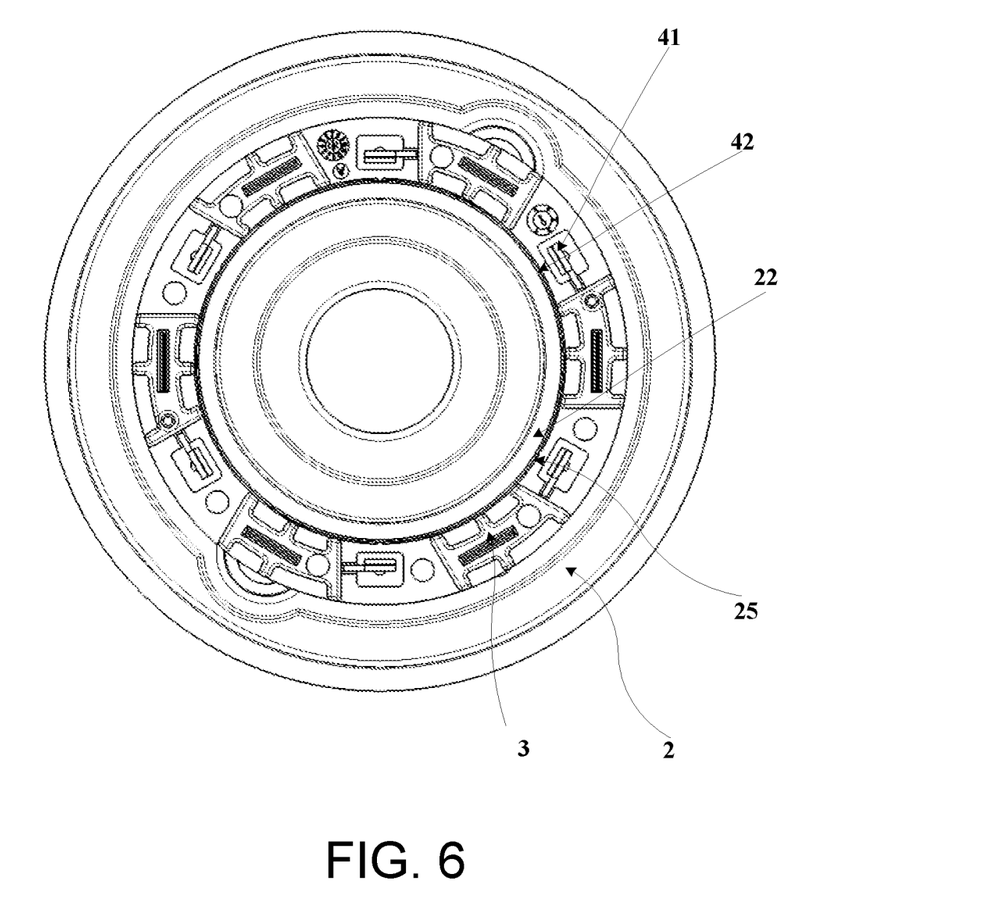
FIG. 6 is a schematic view of the upper busbar assembly and the support plate viewed from above in the axial direction.
Figure 7:
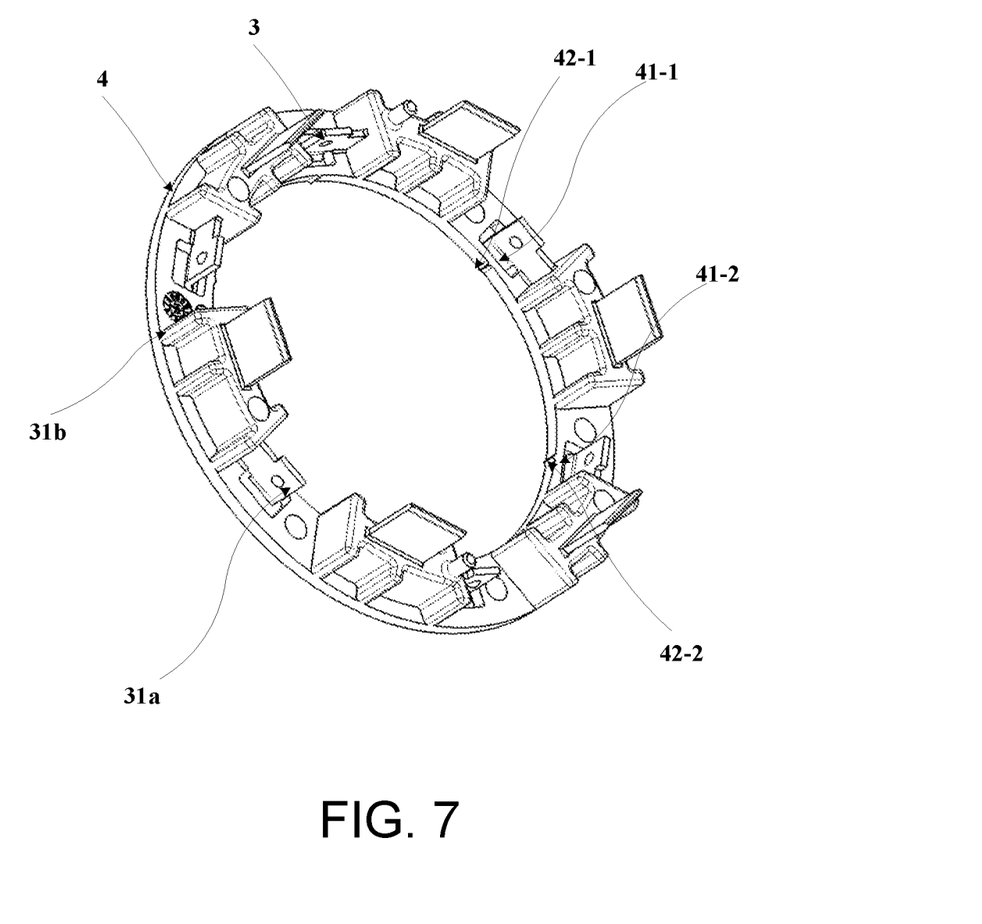
FIG. 7 is another schematic view of the upper busbar assembly of the motor shown in FIG. 1.

FIG. 6 is a schematic view of the upper busbar assembly and the support plate 2 viewed from above in the axial direction. FIG. 7 is another schematic view of the upper busbar assembly of the motor shown in FIG. 1.

In some exemplary embodiments, as shown in FIG. 6 and FIG. 7, the upper busbar holder 4 is mounted on the upper surface 22 of the support plate 2 through interference fitting, and rib components 42 are configured on the inner circumference of the upper busbar holder 4 at a position radially opposite to the first through-hole 41, and the rib components 42 abut against the support plate 2.

For example, as shown in FIG. 7, the rib components 42-1 are defined on the inner circumference of the upper busbar holder 4 and a position radially opposite to the first through-hole 41-1, and a rib component 42-1 is defined at a position radially opposite to the first through-hole 41-2. Similarly, there are 6 rib components 42 defined on the inner circumference of the upper busbar holder 4 and positions opposite to the 6 first through-holes 41. As shown in FIG. 4, a ring component 25 is defined on the upper surface of the support plate 2, and the rib component 42 abuts against the ring component 25. In this manner, the six rib components 42 on the inner circumference of the upper busbar holder 4 abut against the support plate 2. However, the present disclosure is not limited thereto, and the number of first through-holes 41 and rib components 42 may be greater or less than six.

In this manner, when the upper busbar holder 4 is pressed into the support plate 2, the rib component 42 may expand radially outwards to adjust the concentricity of the upper busbar holder 4 and the support plate 2, and it is possible to prevent the rib component from being damaged during configuration.

In the above example, the upper busbar holder 4 serves as an example to realize interference fitting through the abutment of the rib component 42 and the ring component 25 of the support plate 2, but the disclosure is not limited thereto. The abutting method is not limited to abutment of the rib component 42 and the ring component 25, and the support plate 2 may also be configured in other structures to abut against the rib component 42; alternatively, the upper busbar holder 4 may also abut against the support plate 2 through other structures.

For example, a hole is adaptively defined at a position on the support plate 2 corresponding to the rib component 42, so that the rib component 42 is inserted into the hole for connection. However, the present disclosure is not limited thereto, and the rib component 42 may also be connected to the support plate 2 by engaging, sliding, or other means.

In some exemplary embodiments, as shown in FIG. 5, one end 31a of the upper busbar 3 is configured with a first guiding surface 32 inclined in the axial direction, and the other end 51b of the lower busbar 5 is configured with a second guiding surface 52 inclined in the axial direction and facing the first guiding surface 32.

In this way, when the upper busbar assembly is assembled on the support plate 2, through the first guiding surface 32 of the upper busbar 3 and the second guiding surface 52 of the lower busbar 5 disposed opposite to the first guiding surface 32, it is possible to gradually reduce the distance between the upper busbar 3 and the lower busbar 5, thus preventing the rigid connection caused by the interference between the right-angled connection surfaces at the connection between the upper busbar 3 and the lower busbar 5 during assembly, and thereby making the connection between the upper busbar 3 and the lower busbar 5 more convenient.

In some exemplary embodiments, one end 31a of the upper busbar 3 is a bent structure, for example, the axially lower end of the one end 31a is a bent structure, and a surface of the bent structure facing the lower busbar 5 defines the first guiding surface 32.

In this way, the range of the first guiding surface 32 is larger and the first guiding surface 32 may be deformed on the radially inner side to further prevent the interference between the upper and lower busbars during assembly, and making connection easier.

In some exemplary embodiments, as shown in FIG. 4 and FIG. 7, the number of the upper busbars 3 is the same as the number of the second through-holes 21, and both of them are respectively provided in plurality. Each of the upper busbars is L-shaped or substantially L-shaped, and at least a portion of one L-shaped-arm 33 of different upper busbars 3 is axially opposed to different second through-holes 21. The other L-shaped-arm 34 is axially displaced from the second through-hole 21, and the other L-shaped-arm 34 is connected to the external power supply.

For example, as shown in FIG. 4, there are upper busbar 3-1, 3-2, 3-3 . . . which are held on the upper busbar holder 4. In the example of FIG. 4, there are 6 upper busbars 3, and the 6 upper busbars 3 are arranged at equal distance along the circumferential direction. The support plate 2 is configured with second through-holes 21-1, 21-2, 21-3 . . . , which are provided in the same number as the upper busbar 3, that is, 6 second through-holes 21. FIG. 4 is just an example, and the upper busbar 3 and the second through-hole 21 may also be provided in different numbers.

Next, take the upper busbar 3-1 as an example, as shown in FIG. 4, the upper busbar 3-1 has a corner shape or a substantially corner shape similar to an L shape, and an L-shaped arm 33-1 extends along the circumferential direction, and a portion of the arm 33-1 and the second through-hole 21-1 are disposed opposite to each other in the axial direction. The other L-shaped arm 34-1 extends in the axial direction, and the other arm 34-1 is axially displaced from the second through-hole 21-1. That is to say, only a portion of one arm 33-1 of the upper busbar 3-1 is opposite to the second through-hole 21-1.

In this way, it is possible for each upper busbar 3 to correspond to one through-hole, which improves the positional accuracy of the terminals and facilitates electrical connection.

In some exemplary embodiments, a portion of the upper busbar 3 opposite to the second through-hole 21 extends axially to the first through-hole 41. In this way, a more reliable connection is established.

In some exemplary embodiments, as shown in FIG. 5, a portion 41a of the upper busbar holder 4 extends into the second through-hole 21 along the edge of the second through-hole 21. In this manner, the effect of insulation may be achieved. However, the present disclosure is not limited thereto, and a portion 41a of the upper busbar holder 4 may not extend into the second through-hole 21.

In the above exemplary embodiments, the upper busbar holder 4 is disposed on the upper surface 22 of the support plate 2, but the disclosure is not limited thereto, and the upper busbar holder 4 may also be disposed on the lower surface 23 of the support plate 2.

Figure 8:
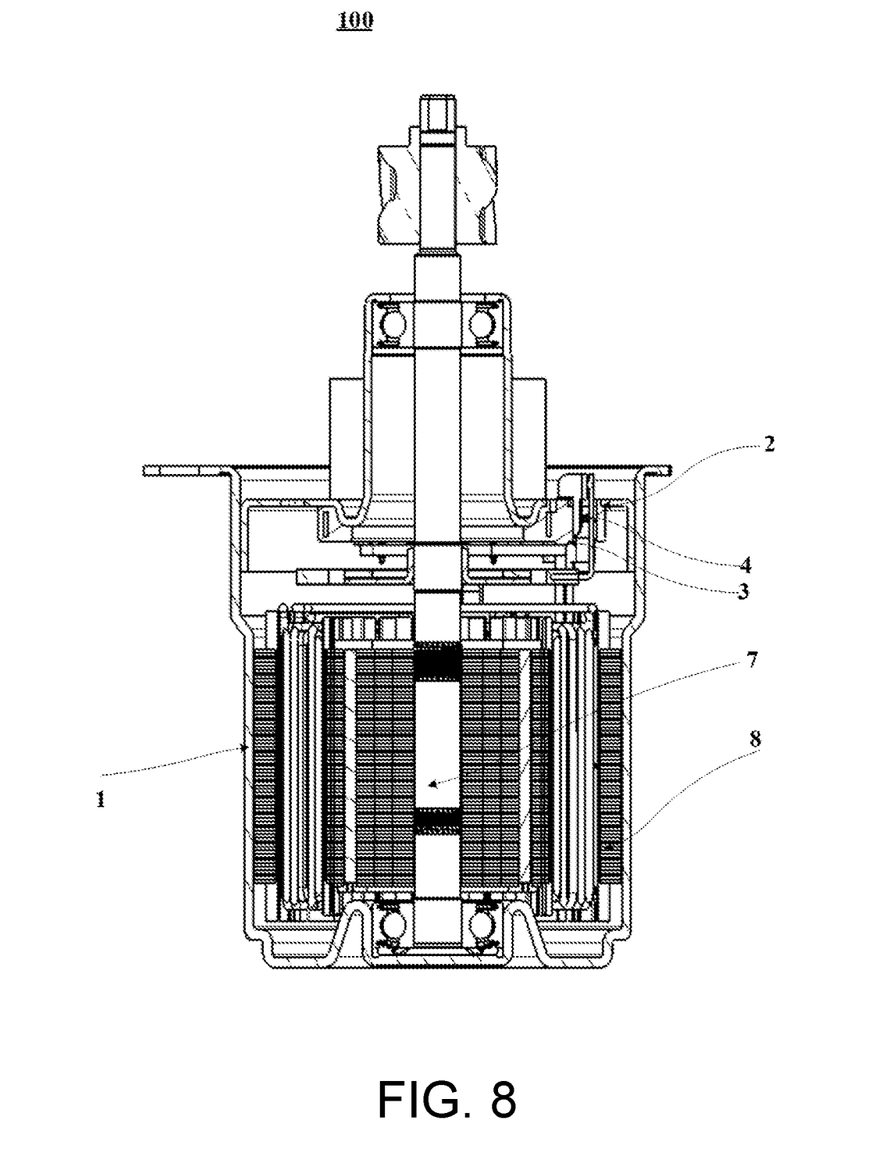
FIG. 8 is a sectional view of another example of the motor in an exemplary embodiment of the present disclosure.
Figure 9:
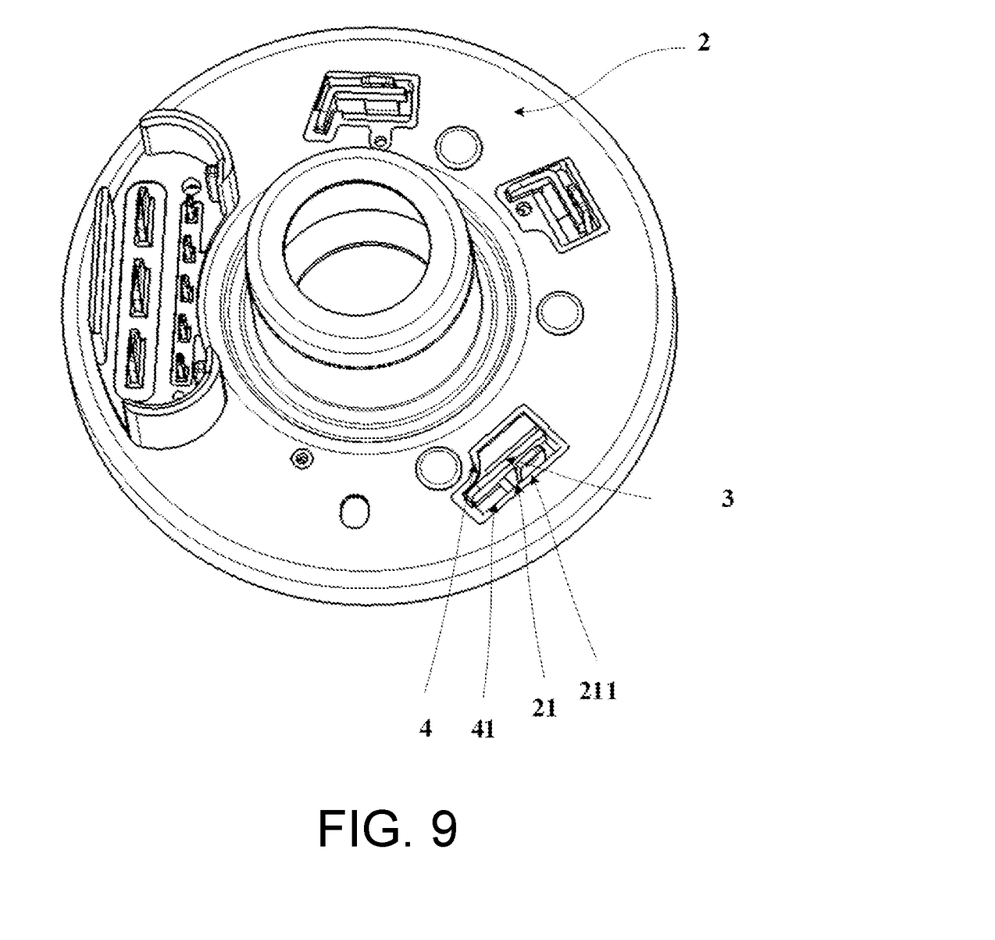
FIG. 9 is a schematic view of the support plate of the motor shown in FIG. 8.

FIG. 8 is a sectional view of another example of the motor in an exemplary embodiment of the present disclosure. FIG. 9 is a schematic view of the support plate of the motor shown in FIG. 8.

In some exemplary embodiments, as shown in FIG. 8 and FIG. 9, the upper busbar holder 4 is integrally defined on the lower surface 23 of the support plate 2, and the outer circumference of the support plate 2 is interference fitted with the housing 1. The support plate 2 is made of metal, but the disclosure is not limited thereto, and the support plate 2 may also be made of other materials. The upper busbar holder 4 is arranged inside an enclosure defined by the lower surface 23 of the support plate 2.

In this manner, the available space outside the motor 100 is not occupied, and the availability of the space outside the motor 100 is increased.

In some exemplary embodiments, a portion of the upper busbar holder 4 passes through the second through-hole 21 along the edge of the second through-hole 21, and is hooked on the upper surface 22 of the support plate 2, for example, a position 211 of the upper surface 22 of the support plate 2 close to the second through-hole 21, that is, the upper edge 211 of the second through-hole 21. The upper busbar holder 4 is made of resin material, however, the present disclosure is not limited thereto, and other insulating materials may also be adopted.

In this way, through the hooking of the upper busbar holder 4 made of insulating material, on the one hand, the effect of insulation is achieved, and on the other hand, it is possible to prevent the upper busbar holder 4 from falling off the support plate 2.

In an exemplary embodiment of the present disclosure, the support plate 2 may be used as a bearing holder, but the present disclosure is not limited thereto.

In an exemplary embodiment of the first aspect, by dividing the busbar assembly into upper layer and lower layer, and by disposing the upper busbar 3 and the upper busbar holder 4 on the support plate 2, it is possible to avoid the cumulative tolerances generated by the busbar assembly and stator 8 themselves and the cumulative tolerances generated when the busbar assembly and stator 8 are assembled into the housing, thereby improving the positional degree of the terminal in the axial direction. By setting the axially penetrating first through-hole 41 and the second through-hole 21 on the upper busbar holder 4 and the support plate 2 respectively on the axially upper side and lower side, it is possible to make the lower busbar 5 pass through the first through-hole 41 and the second through-hole 21 and to connect to the upper busbar 3, thereby improving the positional degree of the terminal in the circumferential direction, and thus enhancing the positioning accuracy of the terminal in the circumferential direction and the axial direction.

Features of the above-described preferred embodiments and the modifications thereof may be combined appropriately as long as no conflict arises. While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
   a housing;
   a support plate, which is fixed on the housing;
   an upper busbar holder, holding an upper busbar and defined on the support plate;
   a lower busbar holder, holding a lower busbar; wherein
   one end of the upper busbar is connected to the lower busbar, and the other end of the upper busbar is connected to an external power supply;
   one end of the lower busbar is connected to a coil lead wire, and the other end of the lower busbar is connected to the upper busbar,
   wherein,
   the upper busbar holder has a first through-hole penetrating in an axial direction, the support plate has a second through-hole penetrating in the axial direction, and the first through-hole and the second through-hole are at least partially overlapped in the axial direction;
   the other end of the lower busbar passes through the first through-hole and the second through-hole, and is connected to the one end of the upper busbar.

2. The motor according to claim 1, wherein,
   an inner circumferential surface of the housing is configured with a stepped component;
   the support plate is mounted on the stepped component, and the upper busbar holder is mounted on an upper surface of the support plate.

3. The motor according to claim 2, wherein,
the upper busbar holder is mounted on the upper surface of the support plate through interference fitting,
rib components are defined on an inner circumference of the upper busbar holder and a position radially opposite to the first through-hole, and the rib components abut against the support plate.

4. The motor according to claim 1, wherein,
the one end of the upper busbar is configured with a first guiding surface inclined in the axial direction, and the other end of the lower busbar is configured with a second guiding surface inclined in the axial direction and facing the first guiding surface.

5. The motor according to claim 4, wherein,
the one end of the upper busbar is a bent structure, and a surface of the bent structure facing the lower busbar defines the first guiding surface.

6. The motor according to claim 2, wherein,
the number of the upper busbars is the same as the number of the second through-holes, and both of the upper busbars and the second through-holes are respectively provided in plurality, each of the upper busbars is L-shaped, and at least a portion of one L-shaped-arm of the different upper busbars is axially opposed to the different second through-holes, the other L-shaped-arm is axially displaced from the second through-hole, and the other L-shaped-arm is connected to the external power supply.

7. The motor according to claim 6, wherein,
a portion of the upper busbar that is opposite to the second through-hole extends axially to the first through-hole.

8. The motor according to claim 2, wherein
a portion of the upper busbar holder extends into the second through-hole along an edge of the second through-hole.

9. The motor according to claim 1, wherein,
the upper busbar holder is integrally defined on a lower surface of the support plate, and an outer circumference of the support plate is interference fitted with the housing.

10. The motor according to claim 9, wherein,
a portion of the upper busbar holder passes through the second through-hole along an edge of the second through-hole, and is hooked on an upper surface of the support plate.

* * * * *